Nov. 18, 1958  A. J. RICHARD  2,860,475
POWER LAWNMOWER
Filed Sept. 4, 1956  2 Sheets-Sheet 1
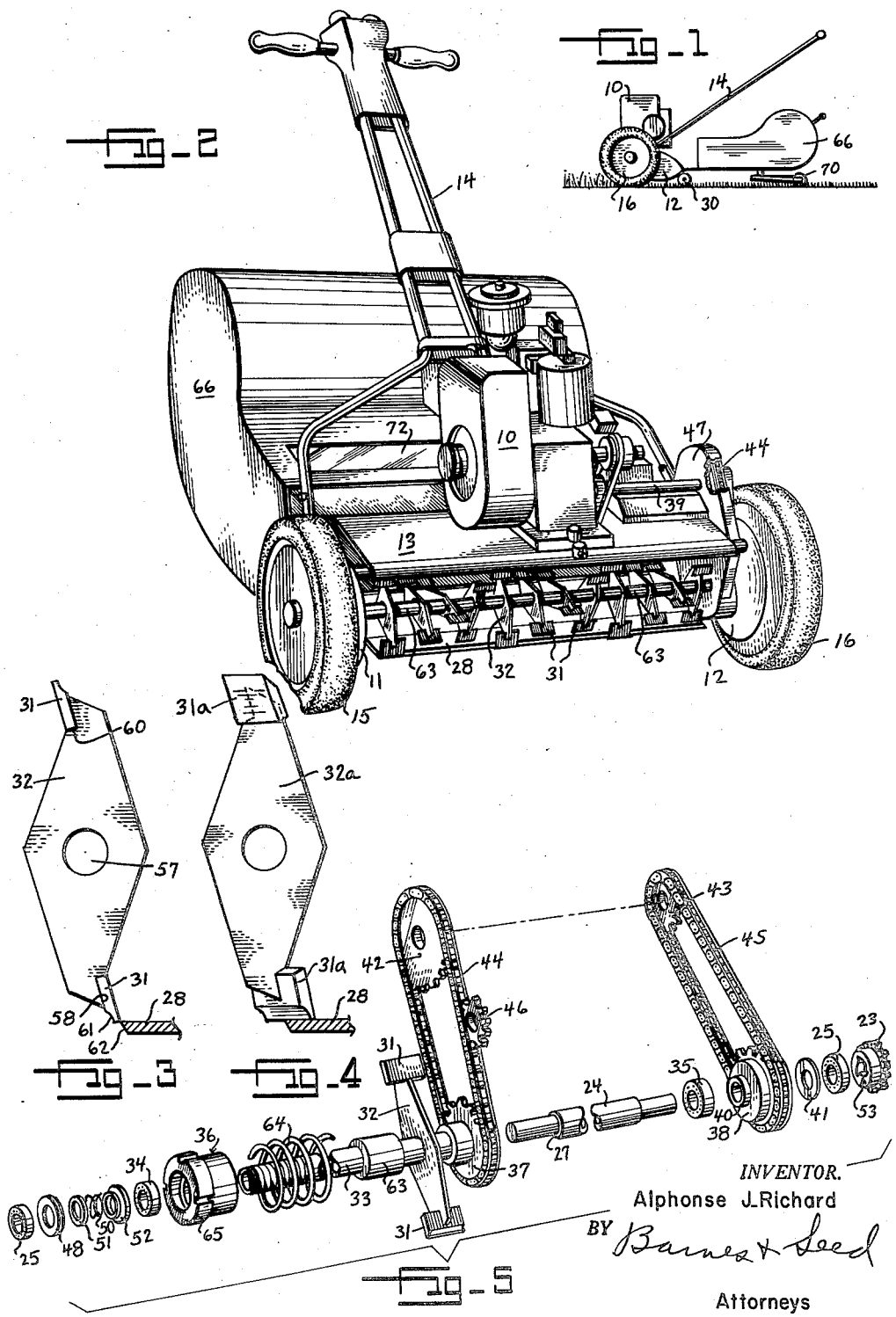
INVENTOR.
Alphonse J. Richard
BY Barnes & Seed
Attorneys

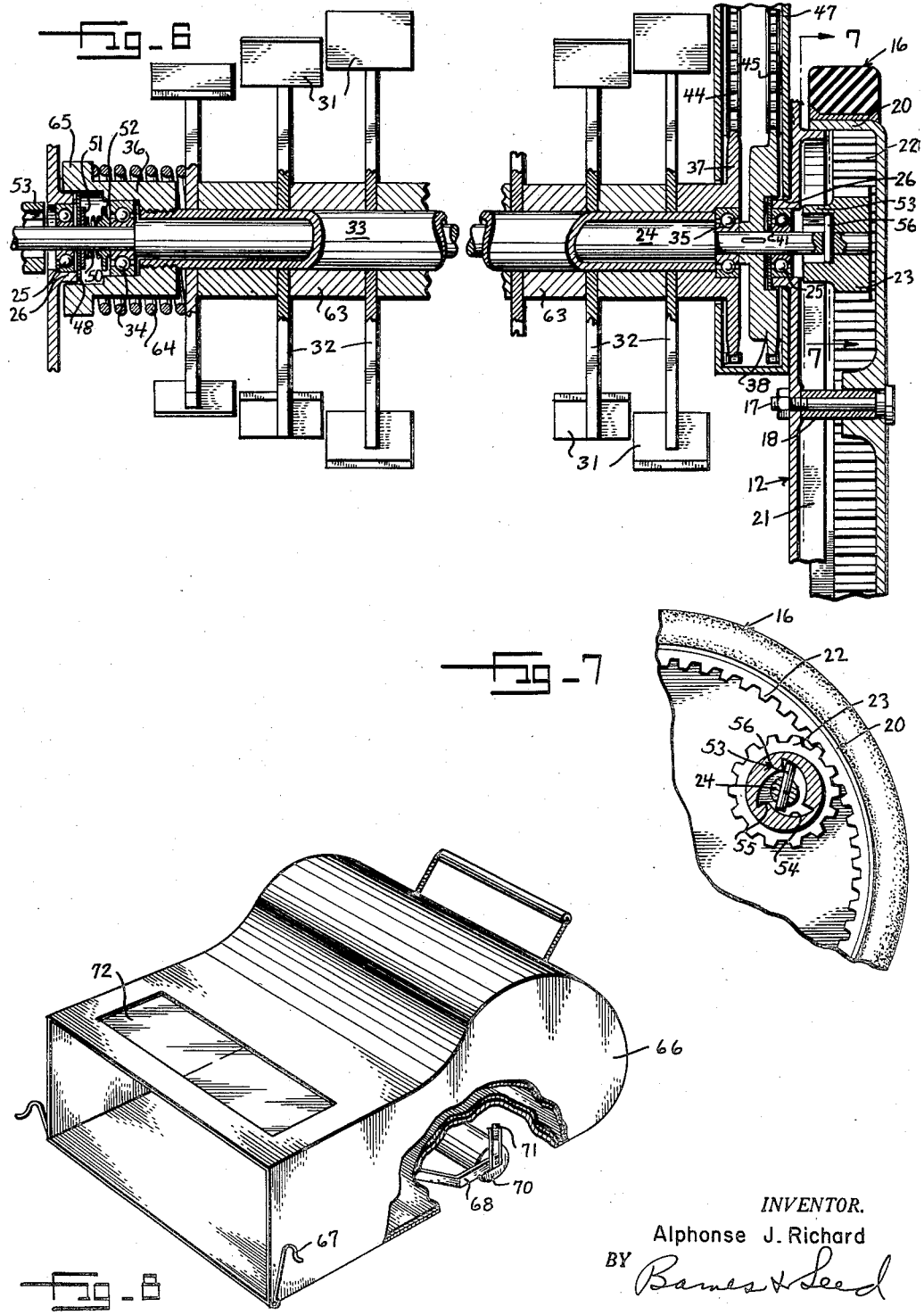

United States Patent Office 2,860,475
Patented Nov. 18, 1958

2,860,475

POWER LAWNMOWER

Alphonse J. Richard, Seattle, Wash.

Application September 4, 1956, Serial No. 607,724

7 Claims. (Cl. 56—26)

The present invention relates to improvements in power lawnmowers of the so-called reel type, that is to say, mowers in which the cutting assembly rotates about a horizontal axis and the cut grass is expelled to the rear for collection as in a catcher carried by the mower.

Most mowers of the reel type have helical cutting blades which cause the cut grass to be expelled at an angle with respect to the mower's travel path, and therefore when a catcher is used, the cut grass tends to pile up at one side of the catcher. One of the principal objects of the present invention is to provide an improved mower which will evenly disperse the grass cuttings in the catcher.

The invention further aims to provide such a mower which will be more effective in relatively tall grass.

As still another object, my invention aims to provide an improved cutting means which will not be susceptible to damage from gravel or other foreign objects encountered as has normally been the case in the past.

My invention also aims to provide a mower with these improved features which is of economical construction and whose cutting means can be readily sharpened.

More particular objects and advantages will appear in the course of the following description and claims, the invention consisting in the novel construction and in the adaptation and combination of parts hereinafter described and claimed.

In the accompanying drawings:

Figure 1 is a side elevational view of my power.

Fig. 2 is an enlarged front perspective view of the mower.

Fig. 3 is a further enlarged side elevational view of one of the cutting blade assemblies.

Fig. 4 illustrates a modified cutting blade assembly.

Fig. 5 is an exploded view illustrating in perspective the rotary cutting means and the drive and journal support therefor.

Fig. 6 is an enlarged fragmentary elevational view with parts broken away and shown in section of the rotary cutting means.

Fig. 7 is a fragmentary vertical sectional view taken as indicated by the line 7—7 of Fig. 6; and Fig. 8 is a perspective view, with parts broken away and shown in section, of the grass catcher.

Referring to the drawings it is seen that the frame for my mower provides end plates 11, 12 which support a platform 13 therebetween for a motor 10 and has a rearwardly extending handle structure 14. The frame is supported by a pair of laterally spaced traction wheels 15, 16 which are journaled on the end plates by axle bolts 17 and bearing sleeves 18 carried thereby. An inwardly directed rim 20 is presented by each wheel and such cooperates with a respective concentric outwardly directed circumferential flange 21 provided by the corresponding end plate. The inner faces of the rims 20 are toothed to form sun gears 22 for meshing with planetary gears 23 carried at the ends of a shaft 24. This shaft has its end portions necked at shoulders 27 and journaled by ball bearings 25 in inwardly directed bosses 26 which are formed in the end plates 11, 12. The bosses 26 are offset rearwardly and downwardly from the bolts 17.

Near their rear ends the end plates 11, 12 carry a shearing blade 28 beyond which is journaled a ground-engaging roller 30 as is conventional in most reel-type mowers. Cooperating with this blade 28 are a plurality of cutting blades 31 which are rigidly mounted at the ends of blade carriers 32. The latter are in turn sleeved on a hollow shaft 33 through which extends the shaft 24. Ball bearing units 34, 35 having their inner races seated against the shoulders 27 of shaft 24 provide journal support for shaft 33. This is accomplished by way of the fact that the outer races of these bearings fit into the outer ends of a collar 36 and the hub of a sprocket wheel 37, respectively, which are mounted on the ends of shaft 33. Collar 36 is threadably received on its end of the shaft whereas the sprocket wheel is permanently secured in place.

Directing attention to the right side of the mower as viewed from the front, it is seen that the inner shaft 24 is driven by a sprocket wheel 38 which is located between sprocket 37 and end plate 12. The hub of sprocket 38 has an inwardly directed boss 40 pressing against the inner race of bearing 35. It has its outer face counterbored to house a rubber sealing ring 41 and to partly receive the free end of respective boss 26 whose bearing 25 is shielded by the sealing ring. The output shaft 39 of the motor 10 is parallel to the shaft 33 and carries sprocket wheels 42, 43 for cooperating with sprocket wheels 37, 38, respectively, by chains 44, 45. Since it is desired to turn the cutting blades 31 considerably faster than the traction wheels 15, 16, it is desirable to have a speed-up from sprocket 42 to sprocket 37 and a speed reduction from sprocket 43 to sprocket 38. Thus it may be necessary to use an idler sprocket 46 for chain 44 to make it possible to use the desired sprocket ratios. The sprockets and chains may be shielded by a chain housing 47.

Looking at the left side of the mower, it is seen that the threaded collar 36 not only houses bearing 34, but is also counterbored to receive the respective boss 26 in the manner of the sprocket wheel 38. A rubber sealing ring 48 corresponding to the ring 41 shields the bearing 25 and pressed against this ring 48 by a spring 50 is a washer 51. The other end of the spring 50 has a spring seat 52 which rests against the inner race of the bearing 34.

As before mentioned, the necked ends of inner shaft 24 have planetary gears 23 for driving the sun gears 22 provided by the wheels 15, 16. These gears 23 are formed as an integral part of one-way clutches 53 which are best shown in Fig. 7. From the latter it will be seen that each clutch is formed with three cam surfaces 54 each of which gradually increases in radius as it approaches a radial driving face 55. Cooperating with the cam surfaces is a pin 56 which is slidably received through the shaft 24. The length of this pin is such that it will be locked against one of the driving faces 55 when the shaft 24 is driven counterclockwise as viewed in Fig. 7, but will reciprocate back and forth between the cam surfaces when the wheel 16 is turned in such counterclockwise direction due to a manual pushing of the mower.

The blade carriers 32 may be cut from plate stock to have a shape best shown in Fig. 3. They are center-bored at 57 to fit onto the outer shaft 33 and have oppositely extending arms each of which provides a shoulder 58 facing in the expected direction of rotation and an outwardly faced seat 60, radially speaking. The cutting blades 31 are rectangular and each is welded in position with its trailing face centered against the shoulder 58 and its inner side edge resting against the seat 60. The trailing side of the outer cutting edge of each blade is beveled at 61, and in this regard, the underside of the cutting edge of the shearing blade 28 is also beveled as indicated at 62.

Instead of having the cutting blades 31 mounted in parallel relation to the edge of the shearing blade 28, they may be canted as shown by the blades 31a in Fig. 4. In such a case the shoulders 58 are beveled at an angle with respect to the plane of the blade carrier to give the blades a corresponding slant. It is desirable that the blades 31a on opposite ends of each modified blade carrier 32a be sloped in opposite directions so that half of the blades on the mower will tend to throw cut grass toward one side of the mower's travel path and the other half will tend to throw it toward the opposite side. Thus, the result will be a substantially equal dispersal of cut grass in the catcher.

The blade carriers 32 with their blades 31 are kept in properly spaced relation by spacers 63 which are also sleeved on the shaft 33. These spacers may separate parts as shown or perforce can be permanently secured, one to each blade carrier. In either case, it is much preferred that the blade carriers be able to turn relative to the shaft 33. Such turning however is desired only when one of the blades engages a rock or other obstacle. Accordingly, the blade carriers are urged toward one another by a relatively strong compression spring 64 which is sleeved on the collar and is seated at its outer end against an enlarged head 65 provided by the latter. The inner end of the spring bears against the outer face of the most adjacent blade carrier, this spring arrangement being best shown in Fig. 6. Spring 64 is initially loaded by screwing the collar 36 onto the shaft 33, and to aid in turning the collar it is desirable to have the head 65 slotted to receive a spanner wrench. As the collar 36 is tightened the blade carrier at the opposite end of the shaft 33 is forced against the hub of the sprocket wheel 37. Thus, this hub and the enlarged collar head 65 serve as stops. The blade carriers 32 are normally initially set with their arms angularly displaced relative to another so that their cutting blades 31 will wipe the shearing blade 28 at regular intervals. If a cutting blade strikes a rock its carrier 32 can overcome the frictional grip of the spacers 63 bearing against the end faces thereof, and hence can back off relative to the turning shaft 33 to give relief.

A catcher 66 for the mower is illustrated and such can be detachably connected adjacent the roller 30 in the conventional manner as by wire loops 67 fitting over complementing hooks. The base of the catcher is provided with a swiveled bracket 68 in turn carrying a ground engaging roller 70 and a pair of wheels 71 tracking on the underside of the catcher base. It is desirable that the top of the catcher be enclosed to trap the grass cuttings since otherwise the latter are frequently expelled by the cutting blades with sufficient trajectory to clear the catcher. A transparent window 72 may be provided so that the operator can easily see when the catcher is nearly full.

It is thought that the manner of operation of my improved mower is self-evident from the foregoing detailed account of its objects and construction. To most easily sharpen the mower, the blade carriers 32 are manually turned relative to the shaft 33 to bring the cutting blades into alinement so that they can be sharpened together.

It is thought that the invention will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a lawnmower, a journal-mounted shaft, a power transfer wheel rigidly mounted at one end of the shaft, a collar threadably received on the other end of the shaft, a plurality of blade carriers sleeved on the shaft and independently turnable on the shaft relative to one another, spacers between said blade carriers, and a spring seated against said collar and yieldingly urging said blade carriers and spacers toward said wheel for yieldingly resisting turning of said blade carriers relative to said shaft.

2. In a lawnmower, a hollow shaft, a power transfer wheel and a collar mounted on opposite ends of said shaft and held against endwise movement away from one another to serve as stops, blade carriers sleeved on said shaft and independently turnable on the shaft relative to one another, compressed spring means surrounding said shaft and seated against one of said stops for yieldingly urging said blade carriers toward one another, bearings seated within said wheel and collar, and a shaft extending through said hollow shaft and journaled in said bearings.

3. In a lawnmower, a journal-mounted shaft, stops mounted on the ends of said shaft and held against endwise movement away from one another, one of said stops being threadably received on said shaft and one of said stops comprising a power transfer wheel, blade carriers sleeved on said shaft and independently turnable on the shaft relative to one another, and a spring seated against one of said stops and yieldingly urging said blade carriers toward the other said stop whereby said carriers are yieldingly held against turning movements relative to said shaft.

4. In a lawnmower, a journal-mounted shaft having stops at its ends held against endwise movement away from one another, axially spaced blade carriers carried by said shaft and radiating with respect thereto, and means carried by said shaft between said stops to turn with the shaft and including a spring arranged to yieldingly urge said carriers toward one another whereby said carriers are yieldingly held against turning movements relative to said shaft.

5. In a lawnmower, a journal-mounted shaft having stops at its ends, blade carriers independently sleeved relative to said shaft and radiating therefrom in axially spaced relation, spacing means sleeved on said shaft for holding said carriers apart, a spring seated between one of said stops and the adjacent blade carrier for yieldingly urging said carriers toward the other said stop whereby said carriers are yieldingly held against turning movements relative to said shaft.

6. In a lawnmower, a frame, a laterally extending drive shaft journal-mounted for turning movement near its ends and carried by said frame, said drive shaft having stops located inwardly of its journals and held against endwise movement away from one another, a shearing blade carried by the frame and spaced rearwardly from said drive shaft with its shearing edge in parallel relation thereto, blade carriers independently sleeved on said shaft between said stops, compressed spring means carried by said drive shaft between said stops and operatively associated with said blade carriers for yieldingly urging said blade carriers toward one another whereby said carriers are yieldingly held against turning movements relative to said shaft, and a plurality of cutting blades mounted on said blade carriers and having respective cutting edges which are arranged and adapted to consecutively wipe said shearing blade in response to rotation of said shaft, and means carried by said frame and operatively associated with said shaft for turning the shaft.

7. In a lawnmower, a frame, a shearing blade carried by said frame, a shaft journaled in parallel spaced relation to said blade, power transfer means rigidly mounted on one end of said shaft, a collar mounted on the other end of the shaft, a plurality of radiating arms sleeved along said shaft, and independently turnable in the shaft relative to one another, means between said power transfer means and said collar and including a spring acting in parallel relation to the longitudinal axis of said shaft and operatively associated with said arms for yieldingly urging the latter toward one another to thereby yieldingly resist turning of said arms relative to said shaft, and a plurality of cutting blades mounted on the outer end of said arms and arranged to wipe said shearing blade in response to rotation of said shaft, and means operatively associated with said shaft for turning the shaft to responsively turn said arms.

References Cited in the file of this patent

UNITED STATES PATENTS

| | | |
|---|---|---|
| 1,899,181 | Carolus | Feb. 28, 1933 |
| 1,899,439 | Gratiot | Feb. 28, 1933 |
| 2,110,147 | Mable | Mar. 8, 1938 |
| 2,509,343 | Henderson | May 30, 1950 |
| 2,790,294 | Marich | Apr. 30, 1957 |